(12) United States Patent
Filippov et al.

(10) Patent No.: US 11,233,991 B2
(45) Date of Patent: Jan. 25, 2022

(54) DEVICES AND METHODS FOR INTRA PREDICTION IN VIDEO CODING

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/735,336

(22) Filed: Jan. 6, 2020

(65) Prior Publication Data

US 2020/0145657 A1 May 7, 2020

Related U.S. Application Data

(63) Continuation of application No. PCT/RU2017/000487, filed on Jul. 5, 2017.

(51) Int. Cl.
*H04N 19/11* (2014.01)
*H04N 19/159* (2014.01)
(Continued)

(52) U.S. Cl.
CPC ............ *H04N 19/11* (2014.11); *G06F 17/18* (2013.01); *H04N 19/105* (2014.11);
(Continued)

(58) Field of Classification Search
CPC ..................................................... H04N 19/11
See application file for complete search history.

(56) References Cited

U.S. PATENT DOCUMENTS

| 2006/0203916 A1* | 9/2006 | Chandramouly .... H04N 19/147 375/240.24 |
| 2007/0121728 A1* | 5/2007 | Wang ................... H04N 19/187 375/240.18 |

(Continued)

FOREIGN PATENT DOCUMENTS

| CN | 101523917 A | 9/2009 |
| CN | 101754015 A | 6/2010 |

(Continued)

OTHER PUBLICATIONS

European Patent Office, International Search Report for PCT/RU2017/000487 (Year: 2020).*

(Continued)

*Primary Examiner* — Tsion B Owens
(74) *Attorney, Agent, or Firm* — Leydig, Voit & Mayer, Ltd.

(57) ABSTRACT

A method of decoding encoded video data for providing a residual video coding block is provided. An intra-prediction mode identifier is extracted from the encoded video data. The method includes: generating a predicted video coding block based on a selected intra-prediction mode; pre-selecting a plane-based intra-prediction mode and a further intra-prediction mode, when the extracted intra-prediction mode identifier is equal to a first predefined intra-prediction mode identifier; selecting the plane-based intra-prediction mode or the further intra-prediction mode, based on (a) an additional flag extracted from the encoded video data or (b) a deviation measure; restoring a video coding block based on the residual video coding block and the predicted video coding block. The deviation measure quantifies deviations of a plurality of reference samples from neighboring video coding blocks from a plurality of fitting samples defined by a fitting plane based on the plurality of reference samples.

15 Claims, 9 Drawing Sheets

(51) Int. Cl.
G06F 17/18 (2006.01)
H04N 19/105 (2014.01)
H04N 19/117 (2014.01)
H04N 19/132 (2014.01)
H04N 19/176 (2014.01)
H04N 19/46 (2014.01)

(52) U.S. Cl.
CPC ......... *H04N 19/117* (2014.11); *H04N 19/132* (2014.11); *H04N 19/159* (2014.11); *H04N 19/176* (2014.11); *H04N 19/46* (2014.11)

(56) References Cited

U.S. PATENT DOCUMENTS

| | | | |
|---|---|---|---|
| 2011/0261886 A1* | 10/2011 | Suzuki | H04N 19/103 375/240.16 |
| 2011/0292996 A1* | 12/2011 | Jayant | H04N 19/52 375/240.03 |
| 2012/0147955 A1 | 6/2012 | Budagavi | |
| 2013/0028317 A1* | 1/2013 | Parfenov | H04N 19/154 375/240.12 |
| 2013/0089144 A1 | 4/2013 | Lee | |
| 2014/0126629 A1 | 5/2014 | Park et al. | |
| 2014/0219558 A1* | 8/2014 | Teng | H04N 19/186 382/166 |
| 2019/0028710 A1* | 1/2019 | Fu | H04N 19/172 |
| 2020/0162729 A1* | 5/2020 | Lee | H04N 19/176 |

FOREIGN PATENT DOCUMENTS

| | | |
|---|---|---|
| CN | 103581647 A | 2/2014 |
| CN | 105847794 A | 8/2016 |
| CN | 106851316 A | 6/2017 |
| WO | 2014110568 A1 | 7/2014 |
| WO | 2016066093 A1 | 5/2016 |
| WO | 2017058635 A1 | 4/2017 |
| WO | 2018070896 A1 | 4/2018 |

OTHER PUBLICATIONS

European Patent Office, Written Opinion for PCT/RU2017/000487 (Year: 2020).*

"Series H: Audiovisual and Multimedia Systems, Infrastructure of audiovisual services—Coding of moving video, Advanced video coding for generic audiovisual services," ITU-T H.264, Telecommunication Standardization Sector of ITU, pp. 1-812, International Union of Telecommunication, Geneva, Switzerland (Apr. 2017).

"Series H: Audiovisual and Multimedia Systems, Infrastructure of audiovisual services—Coding of moving video, High efficiency video coding," ITU-T H.265, Telecommunication Standardization Sector of ITU, pp. 1-664, International Union of Telecommunication, Geneva, Switzerland (Dec. 2016).

"Information technology—High efficiency coding and media delivery in heterogeneous environments—Part 2: High efficiency video coding," ISO/IEC 23008-2:2013 (Dec. 2013).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

"Position dependent intra prediction combination," International Telecommunication Union, COM 16-C1046-E, pp. 1-5, International Union of Telecommunication, Geneva, Switzerland (Oct. 2015).

Filippov et al., "Reference sample adaptive filtering for intra coding," ITU-T SG16 Q6, COM 16-C983 R1-E, pp. 1-4, International Union of Telecommunication, Geneva, Switzerland (2015).

Galpin et al., "EE7 Adaptive Clipping in JEM3.0," Joint Video Exploration Team (JVET) of ITU-T SG 16 WP 3 and ISO/IEC JTC 1/SC 29/WG 11, JVET-D0033-r2, 4th Meeting: Chengdu, CN, pp. 1-10 (Oct. 15-21, 2016).

Galpin et al., "Adaptive Clipping in JEM2.0," Joint Video Exploration Team (JVET) of ITU-T SG 16 WP 3 and ISO/IEC JTC 1/SC 29/WG 11, JVET-C0040-r3, 3rd Meeting: Geneva, CH, pp. 1-7 (May 26-Jun. 1, 2016).

Huang et al., "EE2.1: Quadtree plus binary tree structure integration with JEM tools," Joint Video Exploration Team (JVET) of ITU-T SG 16 WP 3 and ISO/IEC JTC 1/SC 29/WG 11, JVET-C0024, 3rd Meeting: Geneva, CH, pp. 1-5 (May 26-Jun. 1, 2016).

Sullivan et al., "Future video coding: Joint Exploration Model 1 (JEM1) for future video coding investigation," ITU-T SG16 Q6, TD 213 (WP 3/16), pp. 1-20, International Union of Telecommunication, Geneva, Switzerland (Oct. 12-23, 2015).

Bouchama et al., "H.264/AVC Data Hiding Based on Intra Prediction Modes for Real-time Applications," Proceedings of the World Congress on Engineering and Computer Science 2012 vol. I, WCECS 2012, San Francisco, USA, pp. 1-5, (Oct. 24-26, 2012).

Alshina et al., "Performance of JEM1.0 tools analysis by Samsung," Joint Video Exploration Team (JVET) of ITU-T SG 16 WP 3 and ISO/IEC JTC 1/SC 29/WG 11, JVET-B0022_r1, 2nd Meeting: San Diego, USA, pp. 1-28 (Feb. 20-26, 2016).

Xiu et al., "EE8: Decoder-side intra mode derivation," Joint Video Exploration Team (JVET) of ITU-T SG 16 WP 3 and ISO/IEC JTC 1/SC 29/WG 11, 4th Meeting: Chengdu, CN, JVET-D0097-r3, XP030150337, pp. 1-5 (Oct. 15-21, 2016).

Sekiguchi et al., "A Novel Video Coding Scheme for Super Hi-Vision," 28th Picture Coding Symposium, PCS2010, Nagoya, Japan, XP030081994, pp. 322-325, Institute of Electrical and Electronics Engineers, New York, New York (Dec. 8-10, 2010).

Chen et al., "Algorithm Description of Joint Exploration Test Model 6 (JEM6)," Joint Video Exploration Team (JVET) of ITU-T SG 16 WP 3 and ISO/IEC JTC 1/SC 29/WG 11, 6th Meeting: Hobart, AU, JVET-F1001v2, XP030150793 (Mar. 31-Apr. 7, 2017).

* cited by examiner

DEVICES AND METHODS FOR INTRA PREDICTION IN VIDEO CODING

CROSS-REFERENCE TO RELATED APPLICATIONS

This application is a continuation of International Application No. PCT/RU2017/000487, filed on Jul. 5, 2017, the disclosure of which is hereby incorporated by reference in its entirety.

TECHNICAL FIELD

Embodiments of the application relate to the field of video coding. More specifically, embodiments of the application relate to an apparatus an encoding apparatus and a decoding apparatus using intra prediction of a video coding block as well as corresponding methods.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into video coding blocks. Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress. The use of sophisticated prediction coding (such as motion compensation and intra-prediction) and partitioning techniques (e.g., quadtree for CUs and PUs as well as residual quadtree for TUs in the HEVC/H.265 standard and quadtree plus binary tree for the JEM reference software from version JEM-3.0 onwards) allowed the standardization committee to significantly reduce the redundancy in PUs. The fundamental difference between the quadtree (QT) and quadtree plus binary tree (QTBT) partitioning mechanisms is that the latter one enables not only square but also rectangular blocks by using partitioning based on both quad- and binary-tree.

In the H.264/AVC standard, four intra-prediction modes are available for 16×16 blocks for a luma color component. One of those modes is plane-based and can predict a source-signal gradient within a block. The formula used to calculate pixels to be predicted using the plane-based mode is expressed as follows:

$$p_{pred}[x,y]=\text{clip3}(0,2^n-1,(a+b(x-7)+c(y-7)+16)>>5),$$

where a, b and c are plane (multiple regression) parameters. It is worth noting that the clip3 function, $p_{pred}[x, y]=\text{clip3}(p_{min}, p_{max}, \hat{p}_{pred}[x, y])$ is used in the equation above. In the clip3 function, $p_{min}$ and $p_{max}$ are the minimum and maximum values of pixels that are possible for a given bit depth (e.g., $p_{min}=0$ and $p_{max}=255$ for bit depth 8) respectively; $\hat{p}_{pred}[x, y]$ and $p_{pred}[x, y]$ are values of predictors at the position [x, y] before and after clipping respectively.

Despite similarities to the DC intra prediction mode, the plane-based intra prediction mode is signaled independently of the other mode(s). For compressing a prediction mode the H.264/AVC standard supports the most probable mode (MPM) which is an estimation of the prediction mode using the above and left adjacent neighboring blocks of a current video coding block. The MPM is the minimum of the prediction modes of these two neighboring blocks. If one of these prediction modes is not available the corresponding value is set to 2 (DC mode). Thus, if these two neighboring blocks are predicted using the plane-based mode, it becomes the MPM. In the HEVC/H.265 standard, the concept of MPM was extended to include not only one mode but a set of prediction modes. In particular, the MPM list can contain up to 3 and 5 intra-prediction modes for the HM and JEM frameworks, respectively.

According to the HEVC/H.265 standard, 35 intra prediction modes are available and include a planar mode (the intra-prediction mode index is 0), a DC mode (the intra-prediction mode index is 1), and 33 directional modes (the intra-prediction mode index ranges from 2 to 34). From the JEM-1.0 software onwards, the set of directional intra-prediction modes has been extended up to 65 modes (almost doubled) by decreasing a step angle between directional intra-prediction modes by a factor of 2. As seen from the listed modes above, a plane-based mode was adopted neither for HEVC/H.265 nor for the JEM software. In fact, this mode was replaced by the planar one that does not always result in a plane-based predictor.

In A. Said, X. Zhao, J. Chen, M. Karczewicz, "Position dependent intra prediction combination," Contribution COM16-C1046-E to the ITU-T Study Group 16 meeting, Geneva, Switzerland, October 2015 (a similar disclosure can be found in WO2017/058635) a new intra-prediction technique referred to as position dependent intra-prediction combination (PDPC) was proposed. PDPC is a tool that performs smoothing over an intra-predictor using both filtered and unfiltered reference samples. It is worth to note that PDPC requires a one-bit flag per each intra-coded block (independently of what intra-prediction mode is selected) to indicate whether this tool is turned on or off.

In US2012/0147955 a mode adaptive intra prediction smoothing technique is presented. The decision to filter reference samples or not as well as the strength of the smoothing filter depends on the selected intra-prediction mode and a flag encoded in the video bit stream. Subject to the intra-prediction mode defined for a block, reference samples could be either smoothed by a filter or used without being modified. The current HEVC/H.265 standard uses this technique partially. Specifically, filter smoothing is turned off for several combinations of intra-mode and block size, i.e. a flag is not required.

In Alexey Filippov, and Vasily Rufitskiy, "Reference sample adaptive filtering for intra coding," ITU-T SG16 Q6, COM16-C983, October 2015, Geneva, Switzerland a reference sample adaptive filter (RSAF) also known as adaptive reference sample smoothing (ARSS) was considered. The main difference with the mode-adaptive intra-prediction smoothing technique is that a data hiding procedure is used to signal a smoothing flag. It was adopted for the Joint Exploration Model 1 (JEM1).

Another method for generating secondary reference samples is described in the patent application PCT/RU2016/000703 based on input reference samples and predicted samples. In a first stage, the respective position of a reference sample $p_{rs1}$ on the opposite side is defined. This position depends on the intra-prediction mode, size of the block to be predicted and the position of a pixel being predicted. If this position does not fall into known reference sample side, generated side values are used. Otherwise, $p_{rs1}$ is calculated from known reference samples. Reference samples $p_{rs0}$ and $p_{rs1}$ are not necessary located at integer pixel position but may require sub-pixel interpolation process, e.g. as defined by HEVC standard. The next stage comprises calculating weights for the reference samples $p_{rs0}$ and $p_{rs1}$. These weights are calculated from the values of distance between pixel position and reference samples $p_{rs0}$ and $p_{rs1}$ ($d_{rs0}$ and $d_{rs1}$ respectively). In fact, distances can be normalized to the overall distance between $p_{rs0}$ and $p_{rs1}$. Evidently, it is possible to derive the value of $d_{rs1}$ from $d_{rs0}$ and vice versa. The predicted pixel value is calculated using distance-weights and reference pixel values on the basis of the following equation:

$$p[x, y] = \frac{d_{rs1}}{D} p_{rs0} + \frac{d_{rs0}}{D} p_{rs1},$$

wherein D denotes the distance between positions of $p_{rs0}$ and $p_{rs1}$. A gradient component $P_{grad}$ of secondary reference samples is derived from the primary reference samples adjacent to bottom-left and upper-right corner pixels of the block to be predicted. Thus, due to the properties of distance weighting equation given above, samples of predicted signal fall within a range between minimum and maximum values of reference sample pixels.

As discussed in "EE7 Adaptive Clipping in JEM3.0" by F. Galpin et al., Contribution JVET-D0033 to the $4^{th}$ JVET meeting, China, 2016, the adaptive clipping mechanism, initially proposed in "Adaptive Clipping in JEM2.0" by F. Galpin et al., Contribution JVET-00040 to the $3^{rd}$ JVET meeting, Switzerland, 2016, is used to restrict pixel values in blocks (e.g., in a predictor) from the JEM-4.0 software onwards. This technique uses clipping bounds that are determined at the encoder side and are explicitly signaled in the bit-stream, namely, in slice headers. Clipping bounds are defined as actual minimum $p_{min}(C)$ and maximum $p_{max}(C)$ sample values of coded pictures separately for every color component. Mathematically, adaptive clipping operation can be presented as follows:

$$p_{pred}(x,y,C) = \text{clip3}(p_{min}(C), p_{max}(C), \hat{p}_{pred}(x,y,C)) = \text{clip} A(\hat{p}_{pred}(x,y,C),C),$$

where C is an index of a selected color component. This mechanism, similar to the clip3( ) function, is directly applied to pixel values, e.g., within a predictor.

For the JEM-3.0 software, a new partitioning mechanism based on both quad-tree and binary tree and known as QTBT was proposed. QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree partitioning.

A major problem not addressed by the above conventional approaches is to integrate a plane-based intra prediction mode (that is missing in the HEVC/H.265 standard) and its modifications based on directional modes into the HM and JEM frameworks without losing the coding efficiency as compared to other intra prediction modes and avoiding a signaling overhead. More specifically, currently there are no solutions for including the plane-based mode in the current intra prediction mode signaling mechanism without adversely affecting other modes that, for example, can be popped out from the MPM list if the plane-based mode or any others are added to this list.

In light of the above, there is a need for improved devices and methods for video coding, which allow increasing the signaling efficiency for intra prediction modes.

SUMMARY

It is an object of the application to provide improved devices and methods for video coding, which allow increasing the signaling efficiency for intra prediction modes.

The foregoing and other objects are achieved by the subject matter of the independent claims. Further implementation forms are apparent from the dependent claims, the description and the figures.

Generally, the application is based on the idea to provide a hierarchical signaling mechanism for including a plane-based intra prediction mode (herein referred to as plane-based mode or PbM) into the current signaling schemes. For instance, in an embodiment, two modes, including PbM and, for instance, the DC intra prediction mode, correspond to index 1 (DC_IDX) that previously indicated only one mode (the DC mode). Then, one of these two modes is either derived or explicitly signaled. Moreover, embodiments of the application provide processing options for PbM and its modifications based on directional modes in PDPC and RSAF/ARSS. Thus, embodiments of the application provide, in particular, the following advantages: additional coding gain can be reached by integration into a codec; embodiments of the application can be used in many potential applications in hybrid video coding paradigms that are compatible with the HM software and the VPX video codec family as well as the JEM software and the VPX/AV1 video codec family that are a state-of-the-art and a next-generation video coding frameworks, respectively; hardware and computational complexities are kept low at both encoder and decoder sides; and embodiments of the application can be easily implemented in codecs that use conventional intra-prediction mechanisms.

The following disclosure employs a plurality of terms which, in embodiments, have the following meaning: Slice—a spatially distinct region of a picture that is independently encoded/decoded. Slice header—Data structure configured to signal information associated with a particular slice. Video coding block (or short block)—an M×N (M-column by N-row) array of pixels or samples (each pixel/sample being associated with at least one pixel/sample value), or an M×N array of transform coefficients. Coding Tree Unit (CTU) grid—a grid structure employed to partition blocks of pixels into macro-blocks for video encoding. Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples. Picture Parameter Set (PPS)—a syntax structure containing syntax elements that apply to zero or more entire coded pictures as determined by a syntax element found in each slice segment header. Sequence Parameter Set (SPS)—a syntax structure containing syntax elements that apply to zero or more entire coded video sequences as determined by the content of a syntax element found in the PPS referred to by a syntax element found in each slice segment header. Video Parameter Set (VPS)—a syntax structure containing syntax elements that apply to zero or more entire coded video sequences. Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples. Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples. Supplemental enhancement information (SEI)—extra information that may be inserted into a video bit-stream to enhance the use of the video. Luma—information indicating the brightness of an image sample. Chroma—information indicating the color of an image sample, which may be described in terms of red difference chroma component (Cr) and blue difference chroma component (Cb).

More specifically, according to a first aspect the application relates to an apparatus for decoding encoded video data, the encoded video data comprising a plurality of frames, each frame being partitioned into a plurality of video coding blocks, including a current video coding block. The apparatus comprises: a decoding unit configured to decode the encoded video data for providing a residual video coding block associated with the current video coding block and to extract an intra-prediction mode identifier from the encoded video data; an intra-prediction unit configured to generate for the current video coding block a predicted video coding block on the basis of a selected intra-prediction mode, wherein the intra-prediction unit is configured to pre-select a plane-based intra-prediction mode and a further intra-prediction mode, in case the extracted intra-prediction mode identifier is equal to a first predefined intra-prediction mode identifier, and to select either the plane-based intra-prediction mode or the further intra-prediction mode on the basis of (a) an additional flag extracted from the encoded video data or (b) a deviation measure, wherein the deviation measure quantifies deviations of a plurality of reference samples from neighboring video coding blocks of the current video coding block from a plurality of fitting samples defined by a fitting plane based on the plurality of reference samples; and a restoration unit configured to restore the current video coding block on the basis of the residual video coding block and the predicted video coding block.

Thus, an improved decoding apparatus for video coding is provided, which allows increasing the coding efficiency by including a plane-based intra-prediction mode, while not adversely affecting the signaling efficiency.

In a further possible implementation form of the first aspect, the intra-prediction unit is configured to determine the deviation measure $E_{DEV}$ on the basis of one of the following equations:

$$E_{DEV} = \frac{1}{N+1}\sum_{k=0}^{N} \Delta[k]^2, \text{ or}$$

$$E_{DEV} = \frac{1}{N+1}\sum_{k=0}^{N} |\Delta[k]|,$$

wherein N+1 denotes the number of reference samples from neighboring video coding blocks of the current video coding block, k denotes a reference sample index and wherein $\Delta[k]$ is defined by the following equation:

$$\Delta[k] = p_{rs}[k] - \hat{p}_{rs}[k],$$

wherein $p_{rs}[k]$ denotes the sample value of the k-th reference sample and $\hat{p}_{rs}[k]$ denotes the fitting sample value of the k-th fitting sample.

In a further possible implementation form of the first aspect, the intra-prediction unit is configured to select the plane-based intra-prediction mode on the basis of the deviation measure $E_{DEV}$, when the deviation measure $E_{DEV}$ is smaller than a predefined deviation threshold $E_{THR}$.

In a further possible implementation form of the first aspect, the decoding unit is configured to extract the predefined deviation threshold $E_{THR}$ from the encoded video data.

In a further possible implementation form of the first aspect, the intra-prediction unit is configured to select the plane-based intra-prediction mode on the basis of the deviation measure $E_{DEV}$ by determining a ratio R and to select the plane-based intra-prediction mode, when the ratio R is smaller than a predefined ratio threshold $R_{THR}$, wherein the intra-prediction unit is configured to determine the ratio R on the basis of one of the following equations:

$$R = \frac{E_{DEV}}{E_{rs}} = \frac{\sum_{k=0}^{N} \Delta[k]^2}{\sum_{k=0}^{N} p_{rs}[k]^2}, \text{ or}$$

$$R = \frac{E_{DEV}}{E_{rs}} = \frac{\sum_{k=0}^{N} |\Delta[k]|}{\sum_{k=0}^{N} |p_{rs}[k]|}.$$

In a further possible implementation form of the first aspect, the decoding unit is configured to extract the predefined ratio threshold $R_{THR}$ from the encoded video data.

In a further possible implementation form of the first aspect, the intra-prediction unit is configured to determine the fitting plane on the basis of the plurality of reference samples by determining fitting plane parameters a, b and c on the basis of the plurality of reference samples such that the plurality of fitting sample values $\hat{p}_{rs}[x, y]$ are defined by the following equation:

$$\hat{p}_{rs}[x,y]=ax+by+c,$$

wherein x, y denote the position of the fitting sample within the frame.

In a further possible implementation form of the first aspect, in case the plane-based intra-prediction mode is the selected intra-prediction mode, the intra-prediction unit is configured to generate the predicted video coding block using the fitting plane.

In a further possible implementation form of the first aspect, the further intra-prediction mode is a DC intra-prediction mode, a PLANAR intra-prediction mode or a directional intra-prediction mode.

In a further possible implementation form of the first aspect, the intra prediction unit is configured to generate for the current video coding block the predicted video coding block on the basis of the selected intra-prediction mode using the position dependent intra prediction combination, PDPC, mechanism.

In a further possible implementation form of the first aspect, the intra prediction unit is configured to remove outliers of the plurality of reference samples and to generate for the current video coding block the predicted video coding block on the basis of the plurality of reference samples without the outliers.

In a further possible implementation form of the first aspect, the intra prediction unit is configured to remove outliers of the plurality of reference samples using RSAF and/or ARSS.

According to a second aspect the application relates to a corresponding method for decoding encoded video data, the encoded video data comprising a plurality of frames, each frame being partitioned into a plurality of video coding blocks, including a current video coding block. The method comprises: decoding the encoded video data for providing a residual video coding block associated with the current video coding block and extracting an intra-prediction mode identifier from the encoded video data; generating for the current video coding block a predicted video coding block on the basis of a selected intra-prediction mode, wherein a plane-based intra-prediction mode and a further intra-prediction mode are pre-selected, in case the extracted intra-prediction mode identifier is equal to a first predefined intra-prediction mode identifier, and either the plane-based intra-prediction mode or the further intra-prediction mode is selected on the basis of (a) an additional flag extracted from the encoded video data or (b) a deviation measure, wherein the deviation measure quantifies deviations of a plurality of reference samples from neighboring video coding blocks of the current video coding block from a plurality of fitting samples defined by a fitting plane based on the plurality of reference samples; and restoring the current video coding block on the basis of the residual video coding block and the predicted video coding block.

Thus, an improved decoding method for video coding is provided, which allows increasing the coding efficiency by including a plane-based intra-prediction mode, while not adversely affecting the signaling efficiency.

The decoding method according to the second aspect of the application can be performed by the decoding apparatus according to the first aspect of the application. Further features of the decoding method according to the second aspect of the application result directly from the functionality of the decoding apparatus according to the first aspect of the application and its different implementation forms.

According to a third aspect the application relates to a corresponding apparatus for encoding video data, the encoded video data comprising a plurality of frames, each frame being dividable into a plurality of video coding blocks, including a current video coding block. The encoding apparatus comprises: an intra-prediction unit configured to generate for the current video coding block a predicted video coding block on the basis of a selected intra-prediction mode of a plurality of intra-prediction modes, including a plane-based intra-prediction mode and a further intra-prediction mode; and an encoding unit configured to generate encoded video data, wherein the encoded video data contains an encoded video coding block based on the predicted video coding block and wherein the encoded video data contains an intra-prediction mode identifier, wherein the encoded video data contains the same intra-prediction mode identifier, in case the plane-based intra-prediction mode or the further intra-prediction mode has been selected.

Thus, an improved encoding apparatus for video coding is provided, which allows increasing the coding efficiency by including a plane-based intra-prediction mode, while not adversely affecting the signaling efficiency.

According to a fourth aspect the application relates to a corresponding method for encoding video data, the encoded video data comprising a plurality of frames, each frame being dividable into a plurality of video coding blocks, including a current video coding block. The encoding method comprises: generating for the current video coding block a predicted video coding block on the basis of a selected intra-prediction mode of a plurality of intra-prediction modes, including a plane-based intra-prediction mode and a further intra-prediction mode; and generating encoded video data, wherein the encoded video data contains an encoded video coding block based on the predicted video coding block and wherein the encoded video data contains an intra-prediction mode identifier, wherein the encoded video data contains the same intra-prediction mode identifier, in case the plane-based intra-prediction mode or the further intra-prediction mode has been selected.

Thus, an improved encoding method for video coding is provided, which allows increasing the coding efficiency by including a plane-based intra-prediction mode, while not adversely affecting the signaling efficiency. The encoding method according to the fourth aspect of the application can be performed by the encoding apparatus according to the third aspect of the application.

According to a fifth aspect the application relates to a computer program comprising program code for performing the method according to the second aspect or the method according to the fourth aspect when executed on a computer.

The application can be implemented in hardware and/or software.

BRIEF DESCRIPTION OF THE DRAWINGS

Further embodiments of the application will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the application may be placed. It is understood that other aspects may be utilized and structural or logical changes may be made without departing from the scope of the application. The following detailed description, therefore, is not to be taken in a limiting sense, as the scope of the application is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
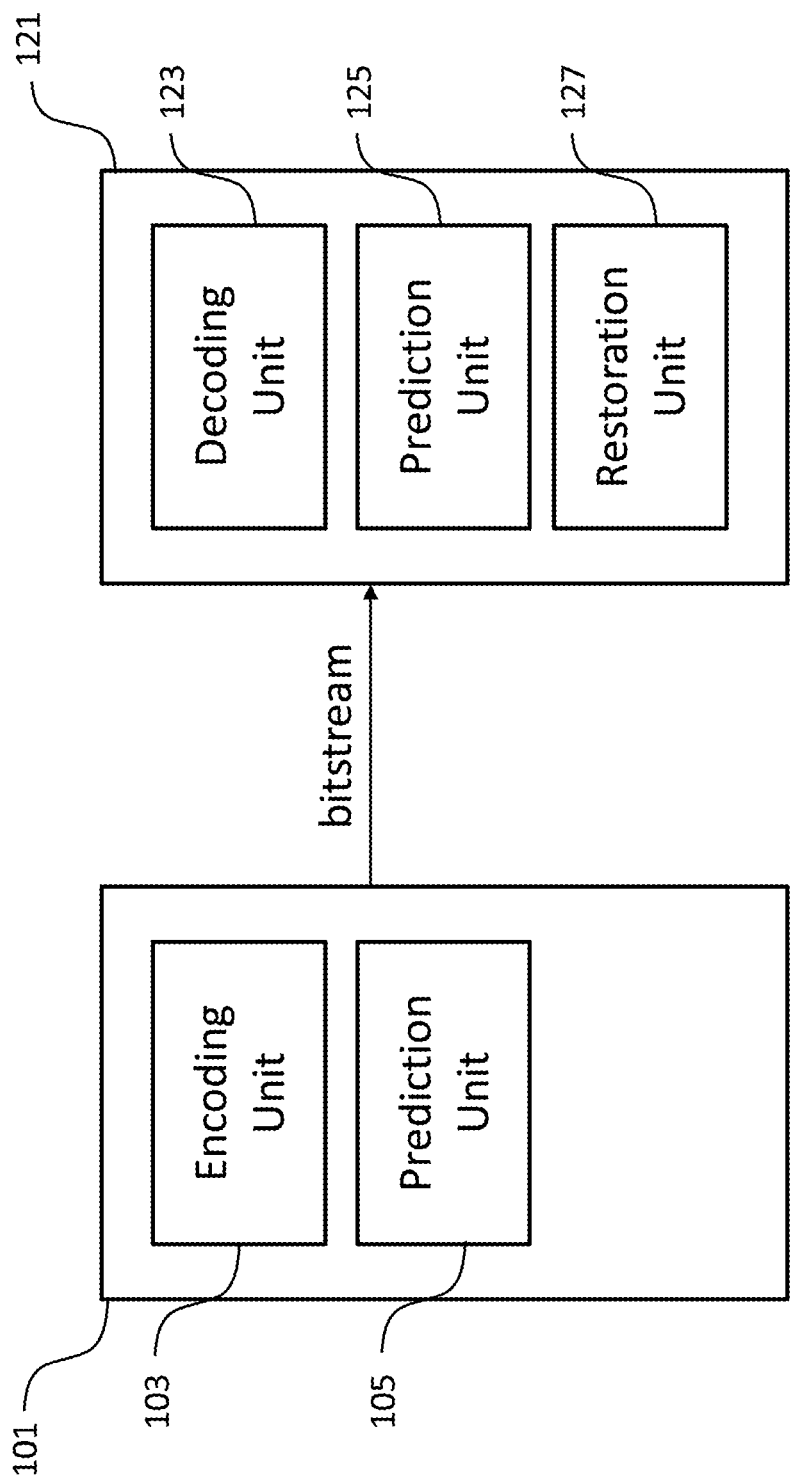
FIG. 1 shows a schematic diagram illustrating an encoding apparatus according to an embodiment and a decoding apparatus according to an embodiment.

FIG. 1 shows a schematic diagram illustrating an encoding apparatus 101 for encoding video data according to an embodiment and a decoding apparatus 121 for decoding video data according to an embodiment.

The encoding apparatus 101 is configured to encode video data, wherein the encoded video data comprises a plurality of frames, each frame is dividable into a plurality of video coding blocks, including a current, i.e. currently processed, video coding block, each video coding block comprising a plurality of samples or pixels having at least one sample or pixel value.

In an embodiment, the current video coding block can be a CU consisting of sub-blocks in the form of PUs and/or TUs. Alternatively, the current video coding block can be a PU consisting of sub-blocks in the form of TUs.

The encoding apparatus 101 comprises an intra prediction unit 105 configured to generate for the current video coding block a predicted video coding block on the basis of a selected intra-prediction mode of a plurality of intra-prediction modes, including a plane-based intra-prediction mode and a further intra-prediction mode. In an embodiment, the intra prediction unit 105 is configured to select a selected intra-prediction mode on the basis of a rate-distortion criterion.

Furthermore, the encoding apparatus 101 comprises an encoding unit 103 configured to generate encoded video data, wherein the encoded video data contains an encoded video coding block based on the predicted video coding block and wherein the encoded video data contains an intra-prediction mode identifier, wherein the encoded video data contains the same intra-prediction mode identifier, in case the plane-based intra-prediction mode or the further intra-prediction mode has been selected by the intra prediction unit 105.

In an embodiment, the encoding apparatus 101 could be implemented as a hybrid encoder, as defined, for instance, in the HEVC standard, and could comprise further components not shown in FIG. 1, such as an entropy encoder.

The decoding apparatus 121 is configured to decode the encoded video data provided by the encoding apparatus 101, for instance, in the form of a bitstream.

The decoding apparatus 121 comprises a decoding unit 123 configured to decode the encoded video data for providing a residual video coding block associated with the current video coding block and to extract an intra-prediction mode identifier from the encoded video data.

Figure 5:
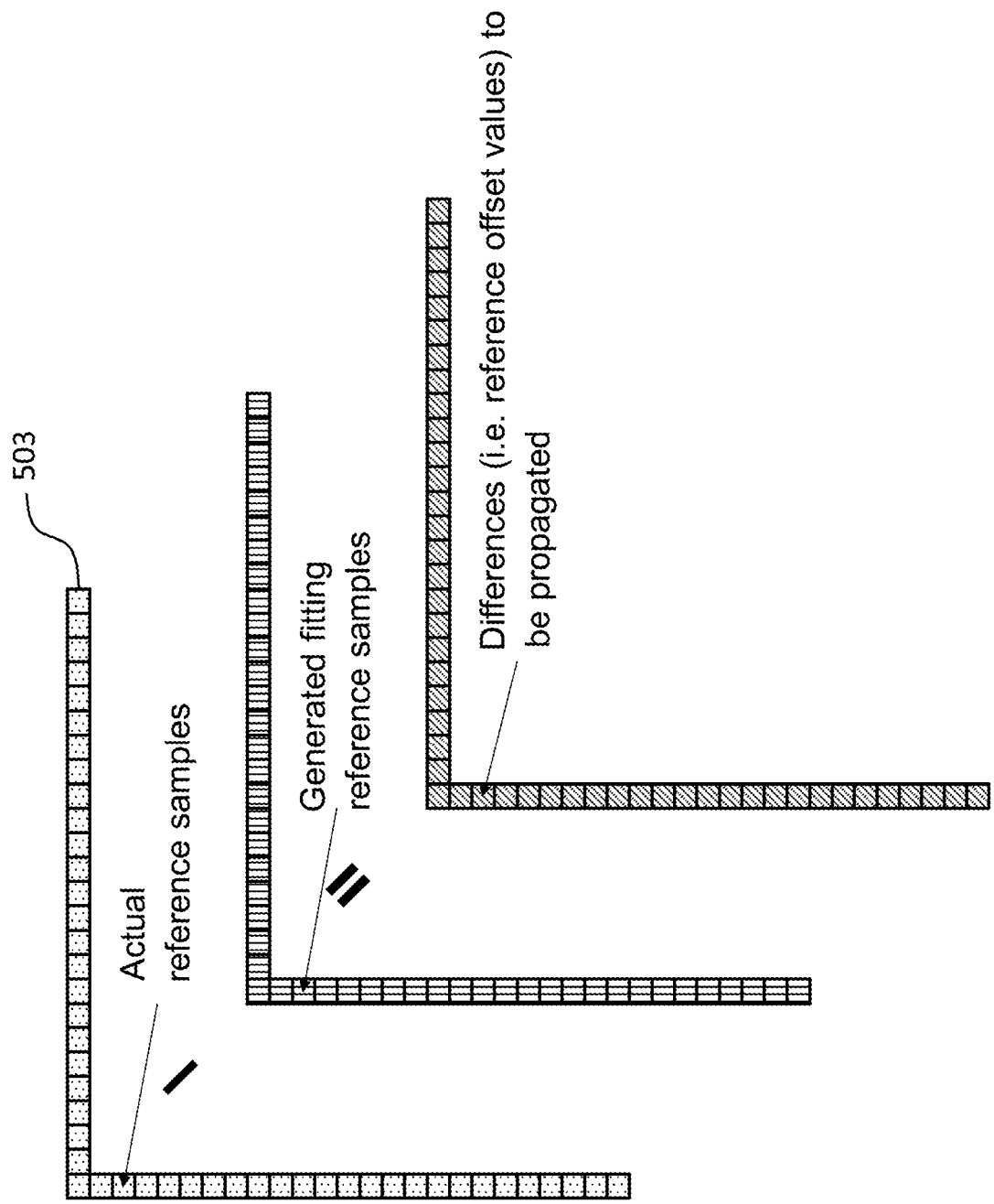
FIG. 5 shows a schematic diagram illustrating the relation between reference samples and fitting samples according to an embodiment.
Figure 6:
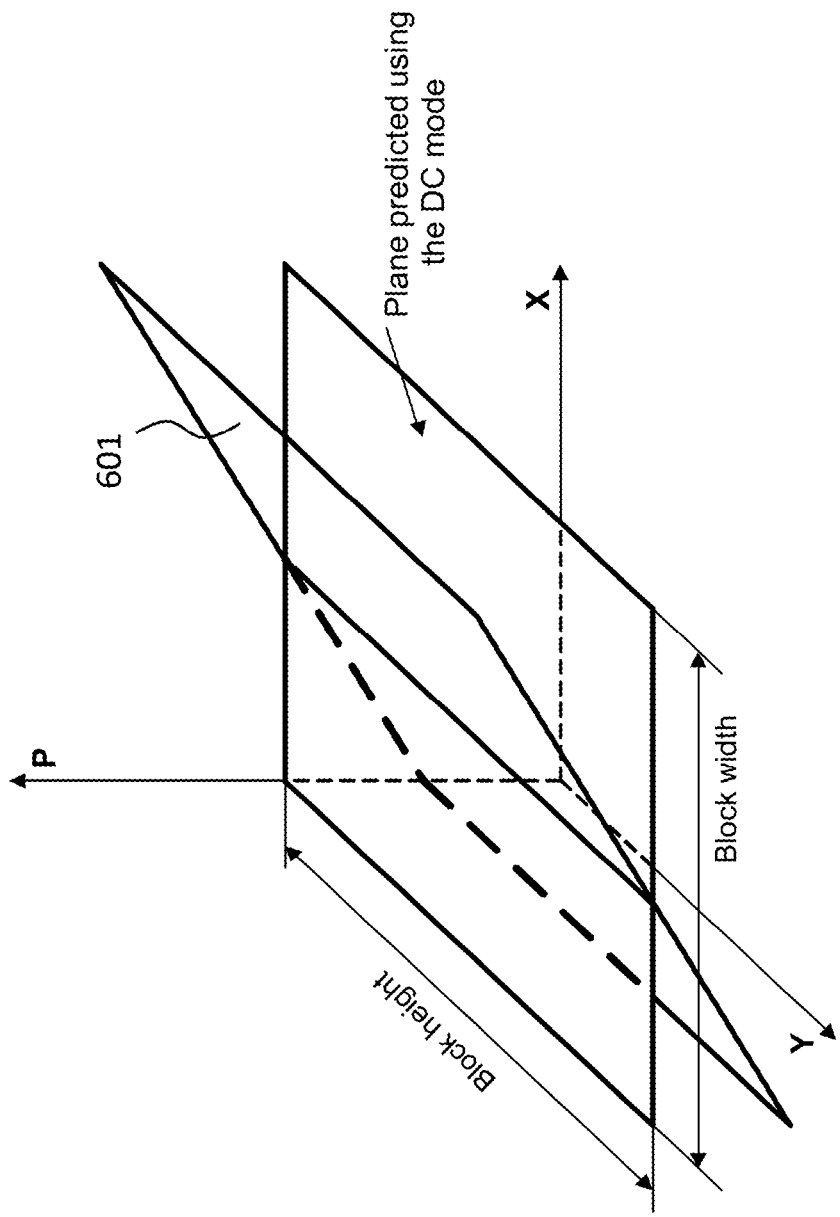
FIG. 6 shows a schematic diagram illustrating a fitting plane determined by an encoding apparatus according to an embodiment and/or a decoding apparatus according to an embodiment.

Moreover, the decoding apparatus 121 comprises an intra prediction unit 125 configured to generate for the current video coding block a predicted video coding block on the basis of the selected intra-prediction mode, wherein the intra-prediction unit is configured to pre-select a plane-based intra-prediction mode and a further intra-prediction mode, in case the extracted intra-prediction mode identifier is equal to a first predefined intra-prediction mode identifier, and to select either the plane-based intra-prediction mode or the further intra-prediction mode on the basis of (a) an additional flag extracted from the encoded video data or (b) a deviation measure, wherein the deviation measure quantifies deviations of a plurality of reference samples 503 (shown in FIG. 5) from neighboring video coding blocks of the current video coding block from a plurality of fitting samples defined by a fitting plane 601 (shown in FIG. 6 based on the plurality of reference samples.

Moreover, the decoding apparatus 121 comprises a restoration unit 127 (sometimes also referred to as transform unit) configured to restore the current video coding block on the basis of the residual video coding block and the predicted video coding block.

In an embodiment, the decoding apparatus 121 could be implemented as a hybrid decoder, as defined, for instance, in the HEVC standard, and could comprise further components not shown in FIG. 1. In case the plane-based intra-prediction mode is the selected intra-prediction mode, the intra-prediction unit 125 can be configured to generate the predicted video coding block using the fitting plane.

In the following further embodiments of the encoding apparatus 101 and the decoding apparatus 121 will be described in more detail.

Figure 2:
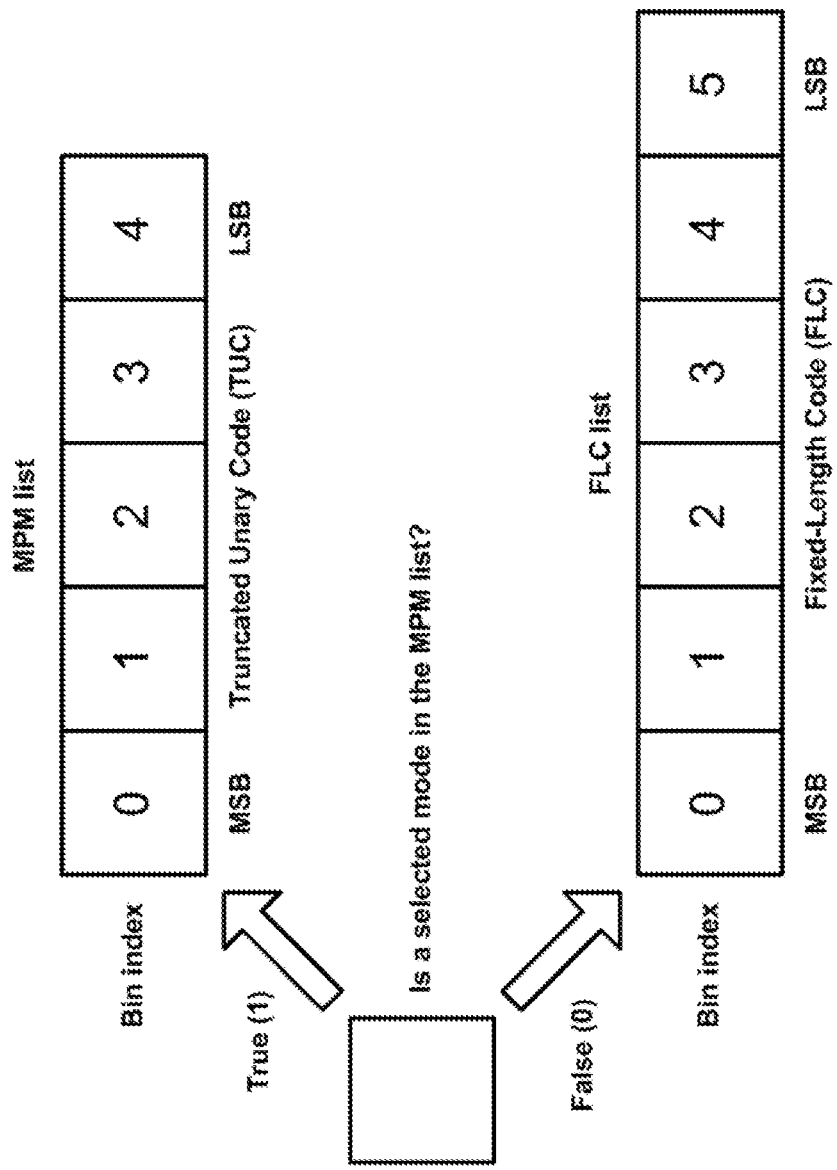
FIG. 2 shows a schematic diagram illustrating the intra-prediction mode signaling of the JEM framework, which can be implemented in an encoding apparatus according to an embodiment and a decoding apparatus according to an embodiment.

FIG. 2 shows a schematic diagram illustrating the intra-prediction mode signaling of the JEM framework, which can be implemented in the encoding apparatus 101 according to an embodiment and the decoding apparatus 121 according to an embodiment. In the current JEM framework, each selected intra prediction mode can be separately signaled using the mechanism shown in FIG. 2. It is worth to note that the DC mode (DC_IDX==1) is the 2nd (after the PLANAR mode) of the default intra-prediction modes in the MPM list. Embodiments of the application avoid a redesign of the current signaling mechanism, by defining that the intra-prediction mode identifier DC_IDX can indicate both the plane-based mode (PbM) as well as, for instance, the DC mode and PbM. In other embodiments, the further intra prediction mode could be, for instance, the PLANAR intra-prediction mode (PLANAR_IDX==0) or a directional intra-prediction mode instead of the DC mode. As already described above, in order to distinguish between these two modes, one of the implementation forms illustrated in FIGS. 3 and 4 can be used.

Figure 3:
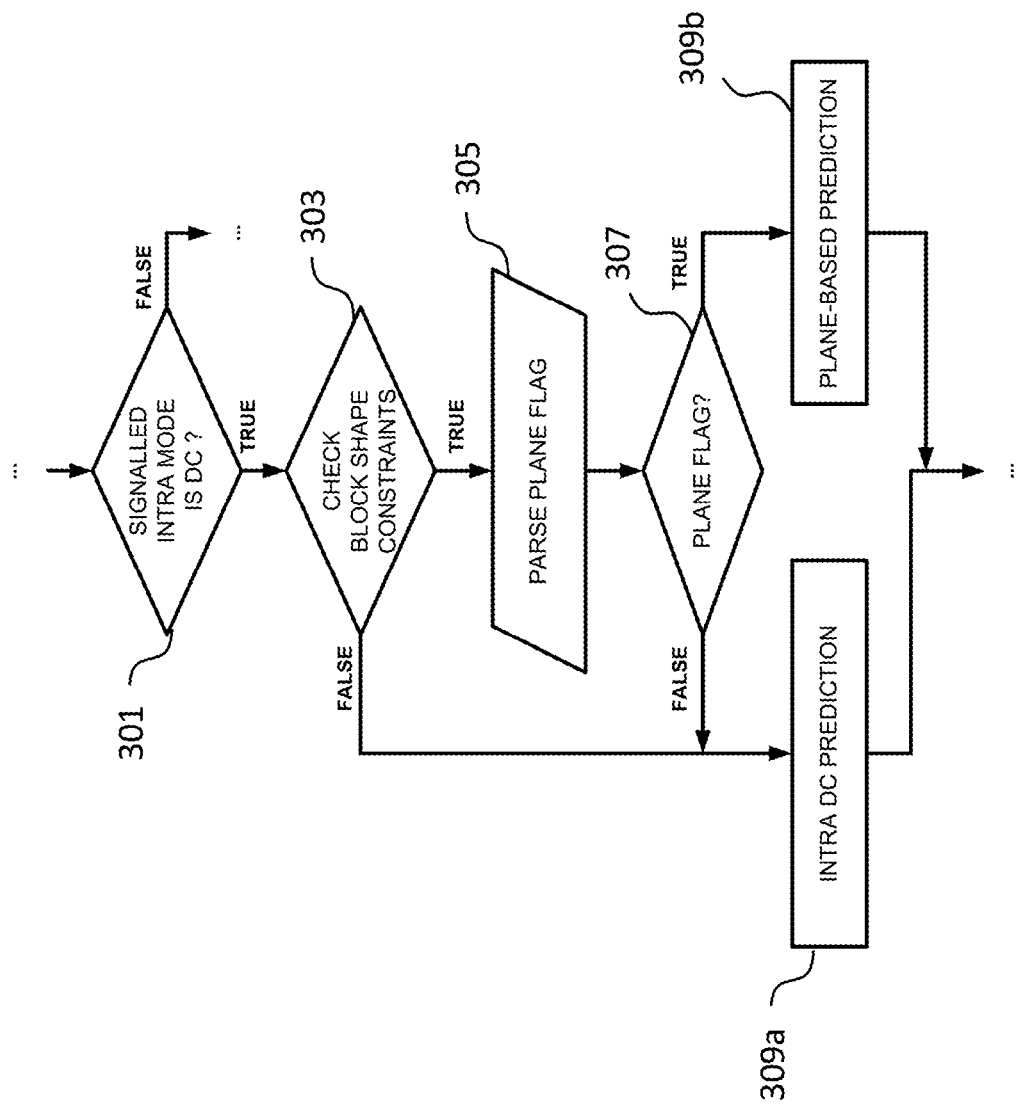
FIG. 3 shows a flow diagram illustrating a first implementation form of intra-prediction mode selection implemented in a decoding apparatus according to an embodiment.

FIG. 3 shows a flow diagram illustrating a first implementation form of intra-prediction mode selection implemented in the decoding apparatus 121 according to an embodiment. In a block 301, the intra prediction unit 125 checks whether the intra-prediction mode identifier indicates to pre-select the plane-based mode and the further intra prediction mode, which in this example is the DC mode. If this is the case, the intra prediction unit 125 can check in a further block 303 whether block shape constraints are met by the current video coding block. For example, for blocks which have a side with length of 4, the intra prediction unit 125 can always select the DC mode. If the block shape constraints are met by the current video coding block, the intra prediction unit 125 proceeds in blocks 305 and 307 by checking whether the encoded video data includes an additional plane flag indicating the use of the plane-based mode. If this flag is set, the intra prediction unit 125 will use the plane-based intra prediction mode (block 309b), otherwise the DC mode (block 309a).

Figure 4:
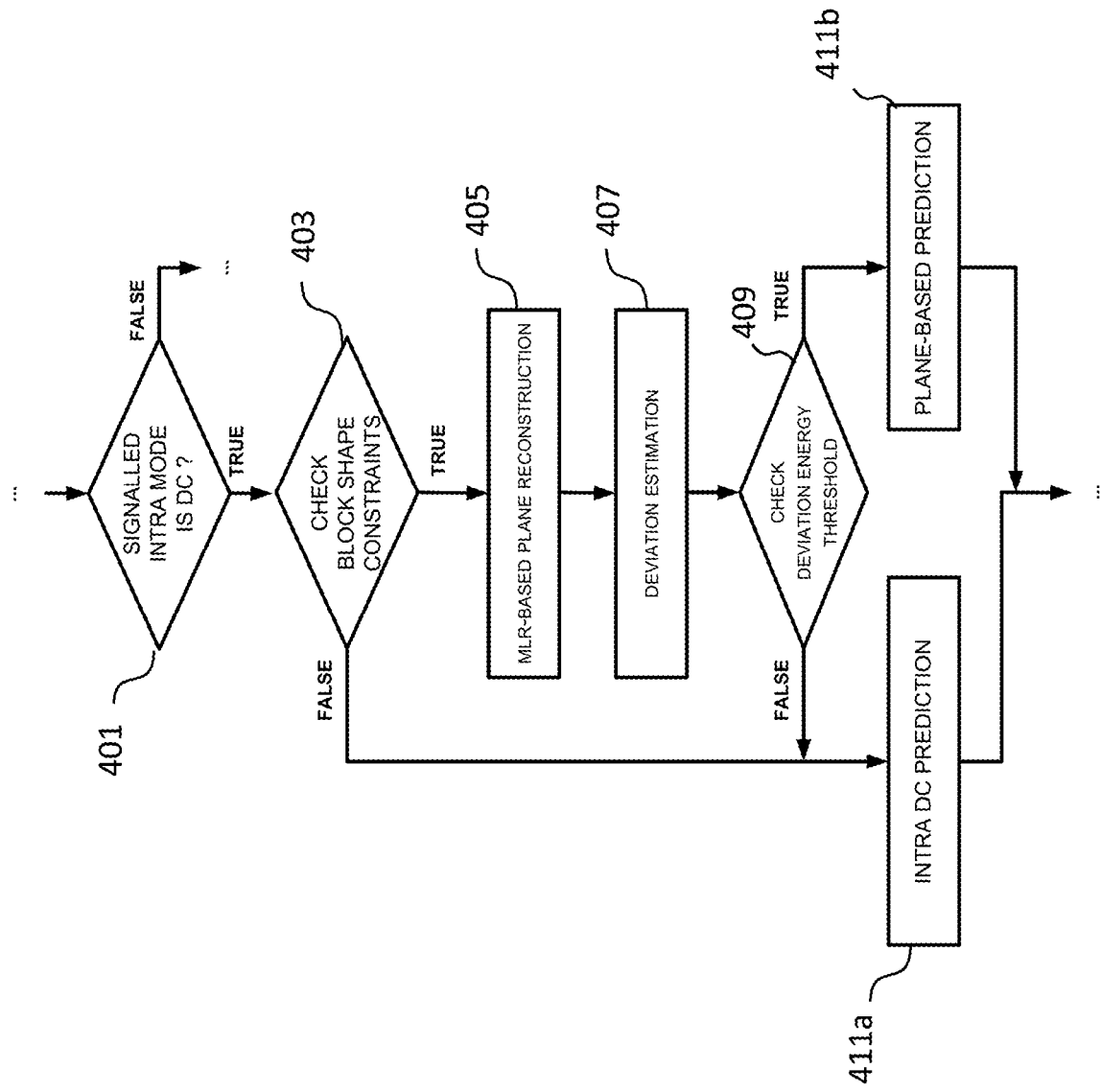
FIG. 4 shows a flow diagram illustrating a second implementation form of intra-prediction mode selection implemented in a decoding apparatus according to an embodiment.

FIG. 4 shows a flow diagram illustrating a second implementation form of intra-prediction mode selection implemented in the decoding apparatus 121 according to an embodiment. In a block 401, the intra prediction unit 125 checks whether the intra-prediction mode identifier indicates to pre-select the plane-based mode and the further intra prediction mode, which in this example is the DC mode. If this is the case, the intra prediction unit 125 can check in a further block 403 whether block shape constraints are met by the current video coding block. For example, for blocks which have a side with length of 4, the intra prediction unit 125 can always select the DC mode. If the block shape constraints are met by the current video coding block, the intra prediction unit 125 proceeds in blocks 405, 407 and 409 by generating a fitting plane on the basis of a plurality of reference samples from neighboring (already predicted) video coding blocks of the current video coding block (block 405), determine the deviations or differences between the plurality of reference sample values and the fitting sample values provided by the fitting plane using a deviation measure (block 407) and checking whether the deviation measure value, i.e. the differences between the plurality of reference sample values and the fitting sample values, which can be represented as a deviation energy $E_{DEV}$ is smaller than a predefined deviation threshold $E_{THR}$. If this is the case, the intra prediction unit 125 will use the plane-based intra prediction mode (block 411b), otherwise the DC mode (block 411a).

As shown in FIG. 4, the decision of which of the two modes should be selected is derived by the intra prediction unit 125, i.e. no additional syntax elements are introduced to distinguish between the DC mode and PbM. The basic idea behind this approach is to estimate how accurate the plane-based prediction is, for example, by computing the deviation energy $E_{DEV}$ relative to the fitting plane generated using the reference samples. The relation between the plurality of reference samples 503 and the corresponding fitting samples is illustrated in FIG. 5.

In an embodiment, the intra-prediction unit 125 is configured to determine the deviation measure $E_{DEV}$ on the basis of one of the following equations:

$$E_{DEV} = \frac{1}{N+1}\sum_{k=0}^{N} \Delta[k]^2, \text{ or}$$

$$E_{DEV} = \frac{1}{N+1}\sum_{k=0}^{N} |\Delta[k]|,$$

wherein N+1 denotes the number of reference samples 503 from neighboring video coding blocks of the current video coding block, k denotes a reference sample index and wherein $\Delta[k]$ is defined by the following equation:

$$\Delta[k] = p_{rs}[k] - \hat{p}_{rs}[k],$$

wherein $p_{rs}[k]$ denotes the sample value of the k-th reference sample and $\hat{p}_{rs}[k]$ denotes the fitting sample value of the k-th fitting sample. It is worth to note that the factor 1/N+1 only depends on block width W and height H, i.e. N=f(W, H). For instance, N=W+H can be used, if the primary reference samples that are adjacent to a block to be predicted are used to estimate parameters of multiple linear regression.

In an embodiment, the intra-prediction unit 125 is configured to select the plane-based intra-prediction mode on the basis of the deviation measure $E_{DEV}$, when the deviation measure $E_{DEV}$ is smaller than a predefined deviation threshold $E_{THR}$.

In an embodiment, the decoding unit 123 is configured to extract the predefined deviation threshold $E_{THR}$ from the encoded video data, which can be signaled using SPS.

In an embodiment, the intra-prediction unit 125 is configured to select the plane-based intra-prediction mode on the basis of the deviation measure $E_{DEV}$ by determining a ratio R and to select the plane-based intra-prediction mode, when the ratio R is smaller than a predefined ratio threshold $R_{THR}$, wherein the intra-prediction unit 125 is configured to determine the ratio R on the basis of one of the following equations:

$$R = \frac{E_{DEV}}{E_{rs}} = \frac{\sum_{k=0}^{N} \Delta[k]^2}{\sum_{k=0}^{N} p_{rs}[k]^2}, \text{ or}$$

$$R = \frac{E_{DEV}}{E_{rs}} = \frac{\sum_{k=0}^{N} |\Delta[k]|}{\sum_{k=0}^{N} |p_{rs}[k]|}.$$

In an embodiment, the decoding unit 123 is configured to extract the predefined ratio threshold $R_{THR}$ from the encoded video data, which can be signaled using SPS.

FIG. 6 shows a schematic diagram of a fitting plane 601 determined by the intra prediction unit 125 using a MLR-based model, wherein the reference samples 503 as illustrated in FIG. 5 are used to estimate regression parameters of the MLR-based model for constructing the fitting plane 601. As a comparison, a fitting plane predicted by the DC mode in the HEVC/H.265 standard is also shown in FIG. 6. Thus, the intra prediction unit 125 is configured to estimate parameters of a Multiple Linear Regression (MLR) and fit the plane 601 to the reference samples 503.

In an embodiment, the intra prediction unit 125 is configured to determine the fitting plane 601 on the basis of the plurality of reference samples 503 by determining fitting plane parameters a, b and c on the basis of the plurality of reference samples 503 such that the plurality of fitting sample values $\hat{p}_{rs}[x, y]$ are defined by the following equation:

$$\hat{p}_{rs}[x,y]=ax+by+c,$$

wherein x, y denote the position of the fitting sample within the frame.

In an embodiment, the intra prediction unit is configured to generate for the current video coding block the predicted video coding block on the basis of the selected intra-prediction mode using the position dependent intra prediction combination (PDPC), mechanism. In such an embodiment the second stage of PDPC would include in addition to the planar mode, the DC mode and the 33 directional modes the plane-based mode as well as any modifications thereof. Moreover, in the third stage of PDPC the look-up tables for the weights have to be adapted. More details about the PDPC mechanism can be found in WO2017/058635, which is herein fully incorporated by reference.

Figure 7:
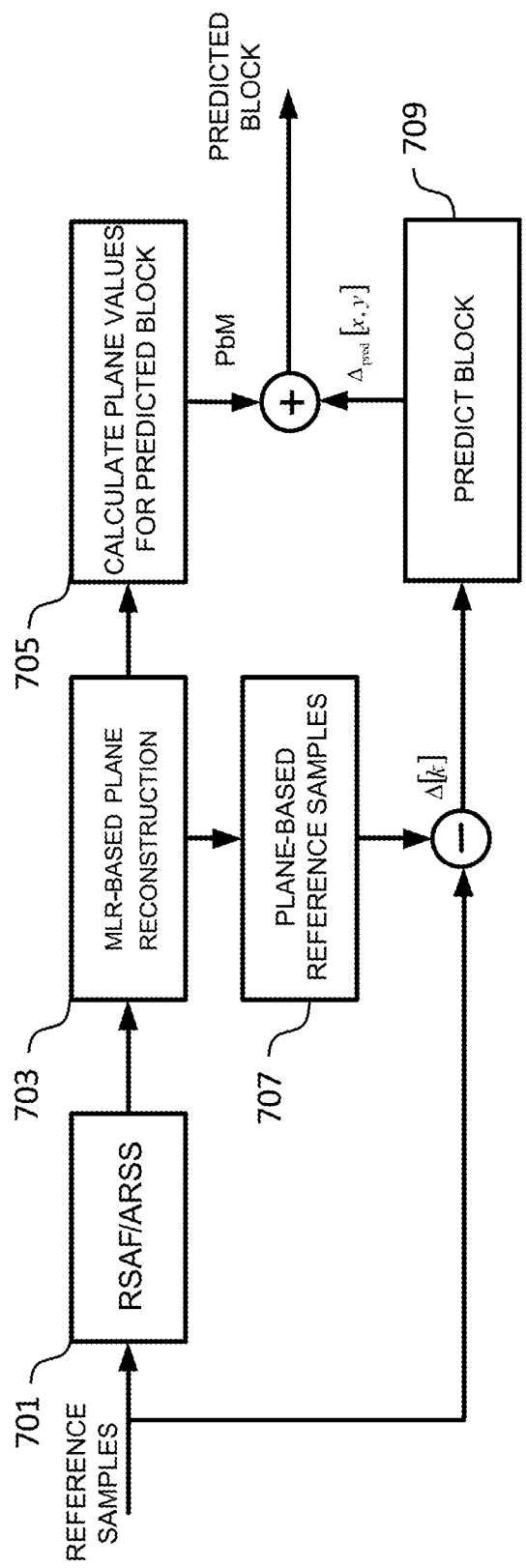
FIG. 7 shows a flow diagram illustrating a further embodiment including filtering of outliers based on RSAF and/or ARSS.

In an embodiment, the intra prediction unit 125 is configured to remove outliers of the plurality of reference samples 503 and to generate for the current video coding block the predicted video coding block on the basis of the plurality of reference samples 503 without the outliers. For instance, the intra prediction unit 125 can be configured to remove outliers of the plurality of reference samples using RSAF and/or ARSS. A corresponding embodiment is illustrated in FIG. 7. In a block 701 the reference samples are processed by a reference sample filter based on RSAF and/or ARSS for suppressing outliers. These filtered reference samples are further used to derive parameters of the fitting plane (block 703). Parameter values are further used to calculate values of the fitting plane at the positions of the reference samples (block 707) and to calculate plane values within the block to be predicted (block 705). Thus, the fitting plane is generated using either unfiltered or filtered reference samples subject to a value of the RSAF/ARSS flag. The results of block 707 are subtracted from the original reference samples and the difference is used to generate a differential prediction signal for the block using a defined intra prediction mode (block 709). The fitting values based on the fitting plane (i.e. the results of block 705) are combined with the differential prediction signal (i.e. the result of block 709) to provide the prediction signal for the block to be predicted.

Figure 8:
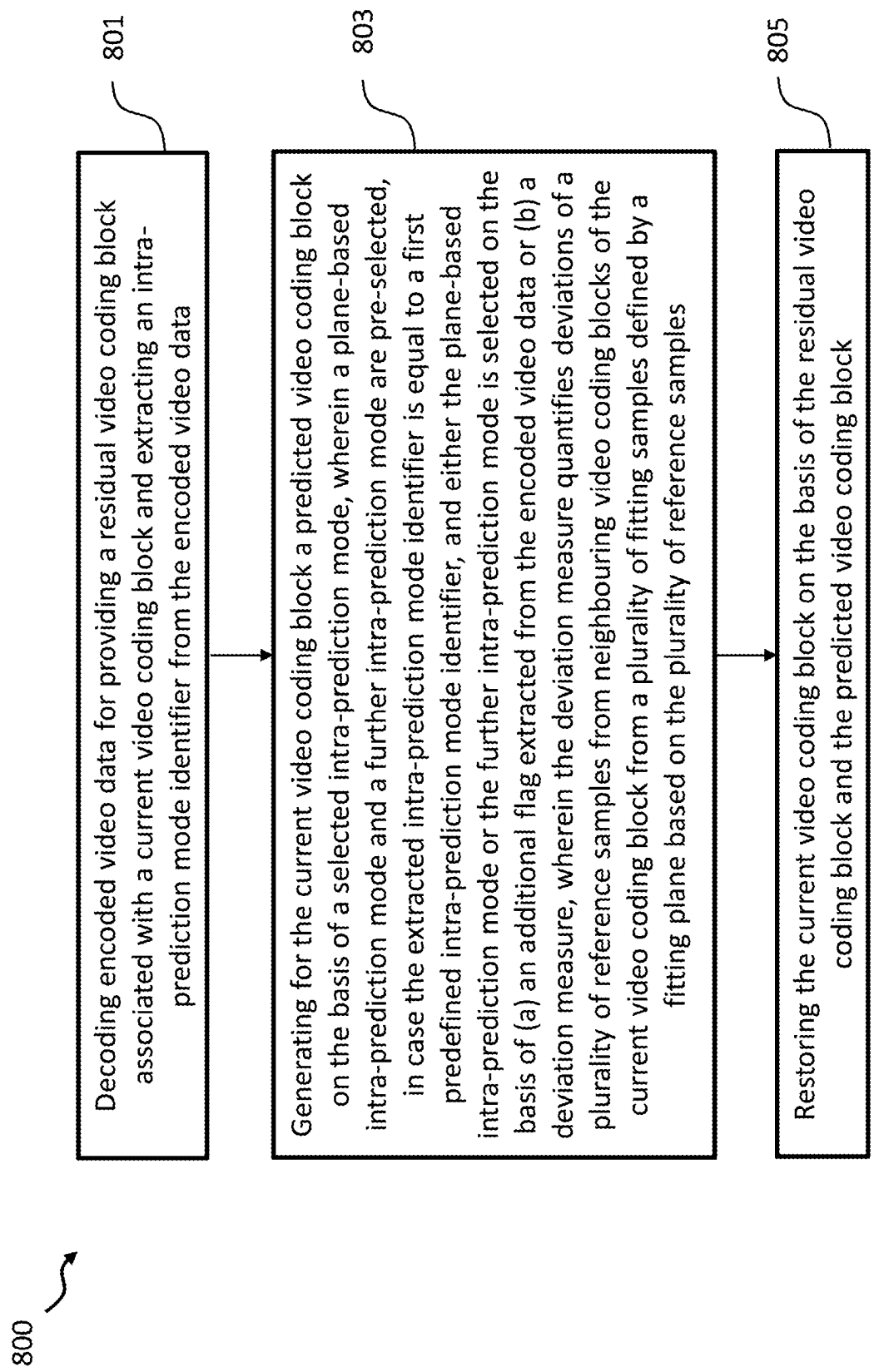
FIG. 8 shows a flow diagram illustrating a decoding method according to an embodiment.

FIG. 8 shows a flow diagram illustrating a corresponding decoding method 800 according to an embodiment. The decoding method 800 comprises the steps of: decoding 801 the encoded video data for providing a residual video coding block associated with the current video coding block and extracting an intra-prediction mode identifier from the encoded video data; generating 803 for the current video coding block a predicted video coding block on the basis of a selected intra-prediction mode, wherein a plane-based intra-prediction mode and a further intra-prediction mode are pre-selected, in case the extracted intra-prediction mode identifier is equal to a first predefined intra-prediction mode identifier, and either the plane-based intra-prediction mode or the further intra-prediction mode is selected on the basis of (a) an additional flag extracted from the encoded video data or (b) a deviation measure, wherein the deviation measure quantifies deviations of a plurality of reference samples from neighboring video coding blocks of the current video coding block from a plurality of fitting samples defined by a fitting plane based on the plurality of reference samples; and restoring 805 the current video coding block on the basis of the residual video coding block and the predicted video coding block.

Figure 9:
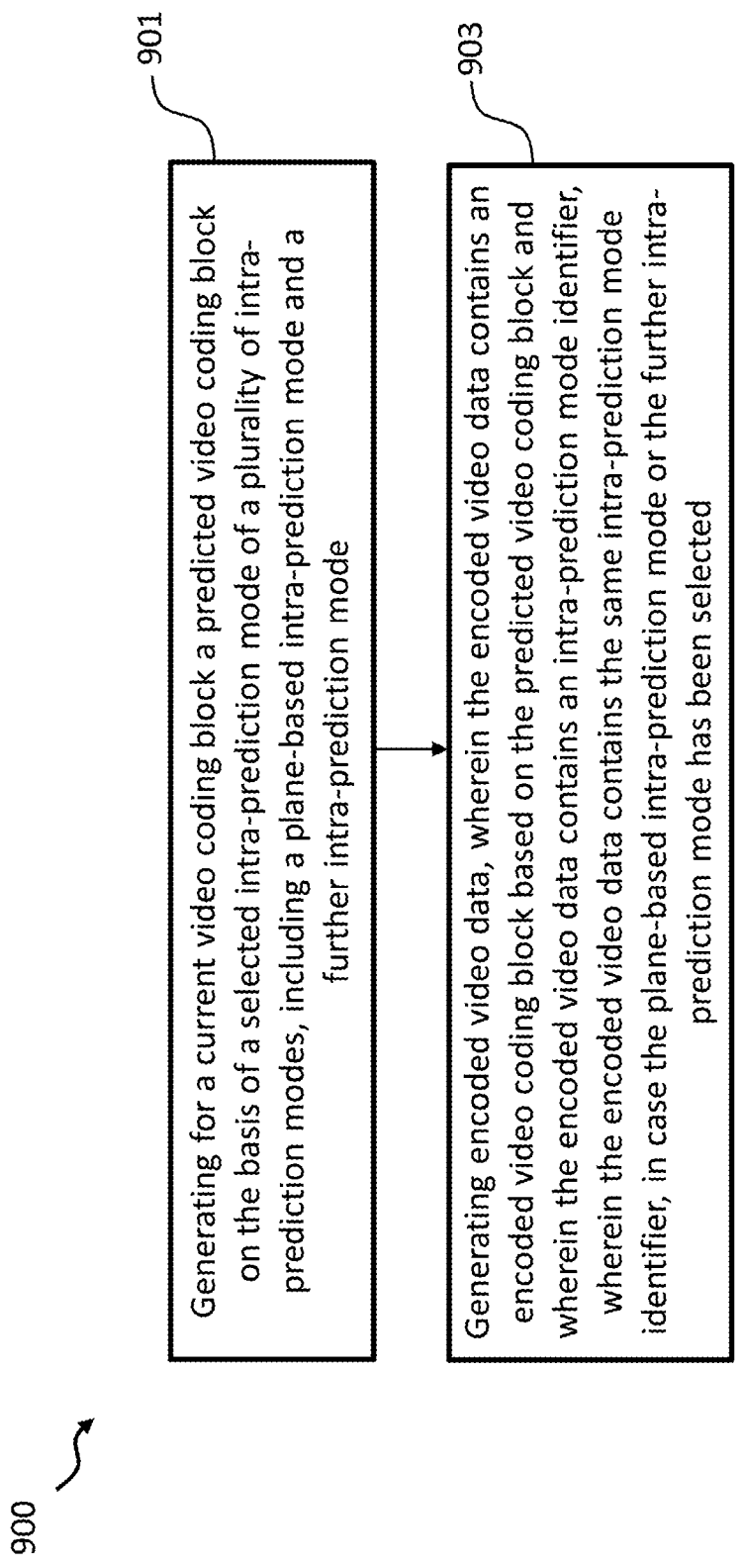
FIG. 9 shows a flow diagram illustrating an encoding method according to an embodiment.

FIG. 9 shows a flow diagram illustrating an encoding method 900 according to an embodiment. The encoding method 900 comprises the steps of: generating 901 for the current video coding block a predicted video coding block on the basis of a selected intra-prediction mode of a plurality of intra-prediction modes, including a plane-based intra-prediction mode and a further intra-prediction mode; and generating 903 encoded video data, wherein the encoded video data contains an encoded video coding block based on the predicted video coding block and wherein the encoded video data contains an intra-prediction mode identifier, wherein the encoded video data contains the same intra-prediction mode identifier, in case the plane-based intra-prediction mode or the further intra-prediction mode has been selected.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the application has been described with reference to one or more particular embodiments, those skilled in the art recognize that many changes may be made thereto without departing from the scope of the application. It is therefore to be understood that within the scope of the appended claims and their equivalents, the application may be practiced otherwise than as specifically described herein.

What is claimed is:

1. An apparatus for decoding encoded video data, the encoded video data comprising a plurality of frames, each frame being partitioned into a plurality of video coding blocks, including a current video coding block, the apparatus comprising:
    a processor, and a memory coupled to the processor, having processor-executable instructions stored thereon, which when executed cause the processor to:
    decode the encoded video data for providing a residual video coding block associated with the current video coding block and to extract an intra-prediction mode identifier from the encoded video data;
    pre-select a plane-based intra-prediction mode and a further intra-prediction mode when the extracted intra-prediction mode identifier is equal to a first predefined intra-prediction mode identifier,
        wherein the further intra-prediction mode is a DC intra-prediction mode, a planar intra-prediction mode or a directional intra-prediction mode;
    select either the plane-based intra-prediction mode or the further intra-prediction mode on the basis of a deviation measure $E_{DEV}$ and a predefined deviation threshold $E_{THR}$,
        wherein the deviation measure quantifies deviations of a plurality of reference samples from neighboring video coding blocks of the current video coding block from a plurality of fitting samples defined by a fitting plane based on the plurality of reference samples, and
        wherein the predefined deviation threshold $E_{THR}$ is extracted from the encoded video data; and
    generate, for the current video coding block, a predicted video coding block on the basis of a selected intra-prediction mode; and
    restore the current video coding block on the basis of the residual video coding block and the predicted video coding block.

2. The apparatus of claim 1, wherein, in response to selecting the plane-based intra-prediction mode or the further intra-prediction mode based on the deviation measure $E_{DEV}$, the processor is further configured to determine the deviation measure $E_{DEV}$ on the basis of one of the following equations:

$$E_{DEV} = \frac{1}{N+1}\sum_{k=0}^{N}\Delta[k]^2, \text{ or } E_{DEV} = \frac{1}{N+1}\sum_{k=0}^{N}|\Delta[k]|,$$

wherein N+1 denotes the number of reference samples from neighboring video coding blocks of the current video coding block, k denotes a reference sample index and wherein $\Delta[k]$ is defined by the following equation:

$$\Delta[k]=p_{rs}[k]-\hat{p}_{rs}[k],$$

wherein $p_{rs}[k]$ denotes the sample value of the k-th reference sample and $\hat{p}_{rs}[k]$ denotes the fitting sample value of the k-th fitting sample.

3. The apparatus of claim 2, wherein the processor is further configured to select the plane-based intra-prediction mode on the basis of the deviation measure $E_{DEV}$, when the deviation measure $E_{DEV}$ is smaller than the predefined deviation threshold $E_{THR}$.

4. The apparatus of claim 2, wherein the processor is further configured to select the plane-based intra-prediction mode on the basis of the deviation measure $E_{DEV}$ by determining a ratio R, when the ratio R is smaller than a predefined ratio threshold $R_{THR}$, wherein the processor is configured to determine the ratio R on the basis of one of the following equations:

$$R = \frac{E_{DEV}}{E_{rs}} = \frac{\sum_{k=0}^{N}\Delta[k]^2}{\sum_{k=0}^{N}p_{rs}[k]^2}, \text{ or}$$

$$R = \frac{E_{DEV}}{E_{rs}} = \frac{\sum_{k=0}^{N}|\Delta[k]|}{\sum_{k=0}^{N}|p_{rs}[k]|}.$$

5. The apparatus of claim 4, wherein the processor is further configured to extract the predefined ratio threshold $R_{THR}$ from the encoded video data.

6. The apparatus of claim 1, wherein, in response to selecting the plane-based intra-prediction mode or the further intra-prediction mode based on the deviation measure $E_{DEV}$, the processor is further configured to determine the fitting plane on the basis of the plurality of reference samples by determining fitting plane parameters a, b and c on the basis of the plurality of reference samples such that the plurality of fitting sample values $\hat{p}_{rs}[x, y]$ are defined by the following equation:

$$\hat{p}_{rs}[x,y]=ax+by+c,$$

wherein x, y denote the position of the fitting sample within the frame.

7. The apparatus of claim 1, wherein, in response to selecting the plane-based intra-prediction mode based on the deviation measure $E_{DEV}$, the processor is further configured to generate the predicted video coding block using the fitting plane.

8. The apparatus of claim 1, wherein the processor is further configured to generate, for the current video coding block, the predicted video coding block on the basis of the selected intra-prediction mode using a position dependent intra-prediction combination (PDPC) mechanism.

9. The apparatus of claim 1, wherein the processor is further configured to remove outliers of the plurality of reference samples and to generate for the current video coding block the predicted video coding block on the basis of the plurality of reference samples without the outliers.

10. The apparatus of claim 9, wherein the processor is further configured to remove outliers of the plurality of reference samples using a reference sample adaptive filter (RSAF) and/or an adaptive reference sample smoothing (ARSS).

11. A method for decoding encoded video data, applied to an apparatus comprising a processor, the encoded video data comprising a plurality of frames, each frame being partitioned into a plurality of video coding blocks, including a current video coding block, the method comprising:
    decoding, by the processor of the apparatus, the encoded video data for providing a residual video coding block associated with the current video coding block and extracting an intra-prediction mode identifier from the encoded video data;
    generating, by the processor of the apparatus, for the current video coding block a predicted video coding block on the basis of a selected intra-prediction mode,
        wherein a plane-based intra-prediction mode and a further intra-prediction mode are pre-selected when the extracted intra-prediction mode identifier is equal to a first predefined intra-prediction mode identifier,
        wherein the further intra-prediction mode is a DC intra-prediction mode, a planar intra-prediction mode or a directional intra-prediction mode, and either the plane-based intra-prediction mode or the further intra-prediction mode is selected on the basis of a deviation measure and a predefined deviation threshold $E_{THR}$,
        wherein the predefined deviation threshold $E_{THR}$ is extracted from the encoded video data, and
        wherein the deviation measure quantifies deviations of a plurality of reference samples from neighboring video coding blocks of the current video coding block from a plurality of fitting samples defined by a fitting plane based on the plurality of reference samples; and
    restoring the current video coding block on the basis of the residual video coding block and the predicted video coding block.

12. An apparatus for encoding video data, the encoded video data comprising a plurality of frames, each frame being dividable into a plurality of video coding blocks, including a current video coding block, the apparatus comprising:
    a processor, and a memory coupled to the processor, having processor-executable instructions stored thereon, which when executed cause the processor to:
        generate, for the current video coding block, a predicted video coding block on the basis of a selected intra-prediction mode of a plurality of intra-prediction modes, including a plane-based intra-prediction mode and a further intra-prediction mode,
            wherein the further intra-prediction mode is a DC intra-prediction mode, a planar intra-prediction mode or a directional intra-prediction mode; and
        generate encoded video data,
            wherein the encoded video data contains an encoded video coding block based on the predicted video coding block,
            wherein the encoded video data contains an intra-prediction mode identifier,
            wherein the encoded video data contains the same intra-prediction mode identifier when the plane-based intra-prediction mode or the further intra-prediction mode has been selected, and
            wherein the encoded video data contains a predefined deviation threshold $E_{THR}$ when the plane-based intra-prediction mode or the further intra-prediction mode has been selected.

13. A method for encoding video data, applied to an apparatus comprising a processor, the encoded video data comprising a plurality of frames, each frame being dividable into a plurality of video coding blocks, including a current video coding block, the method comprising:
    for the current video coding block, generating, by the processor of the apparatus, a predicted video coding block on the basis of a selected intra-prediction mode of a plurality of intra-prediction modes, including a plane-based intra-prediction mode and a further intra-prediction mode, wherein the further intra-prediction mode is a DC intra-prediction mode, a planar intra-prediction mode or a directional intra-prediction mode; and
    generating, by the processor of the apparatus, encoded video data,
        wherein the encoded video data contains an encoded video coding block based on the predicted video coding block and
        wherein the encoded video data contains an intra-prediction mode identifier,
        wherein the encoded video data contains the same intra-prediction mode identifier when the plane-based intra-prediction mode or the further intra-prediction mode has been selected, and
        wherein the encoded video data contains a predefined deviation threshold $E_{THR}$ when the plane-based intra-prediction mode or the further intra-prediction mode has been selected.

14. A non-transitory computer-readable medium comprising program code that, when executed by a processor, causes the processor to perform the method of claim 11.

15. A non-transitory computer-readable medium comprising program code that, when executed by a processor, causes the processor to perform the method of claim 13.

\* \* \* \* \*